Figure 1:
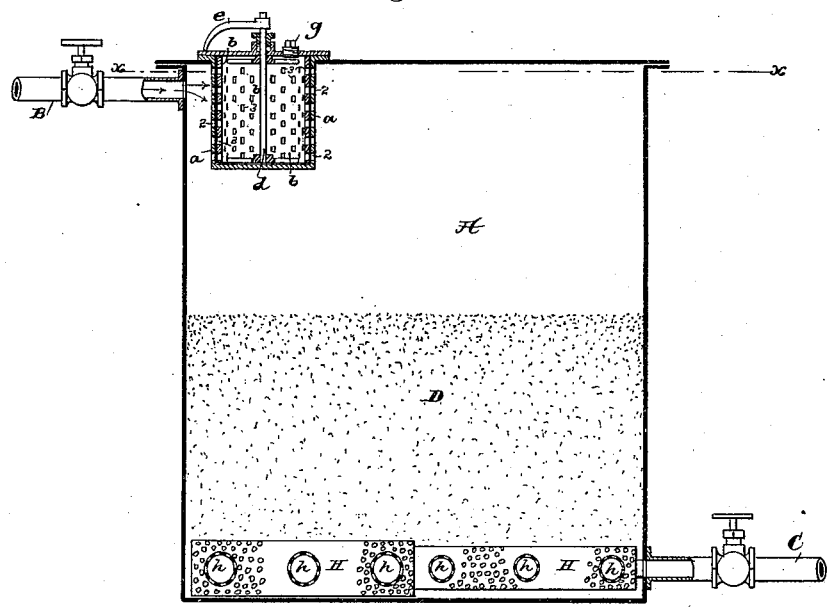

(No Model.) 2 Sheets—Sheet 1.

W. M. DEUTSCH.
FILTER.

No. 355,005. Patented Dec. 28, 1886.

Attest:
Geo. H. Botts
Gv. H. Graham

Inventor:
William M. Deutsch
by Munson & Philipp
Attys.

(No Model.) 2 Sheets—Sheet 2.
W. M. DEUTSCH.
FILTER.
No. 355,005. Patented Dec. 28, 1886.
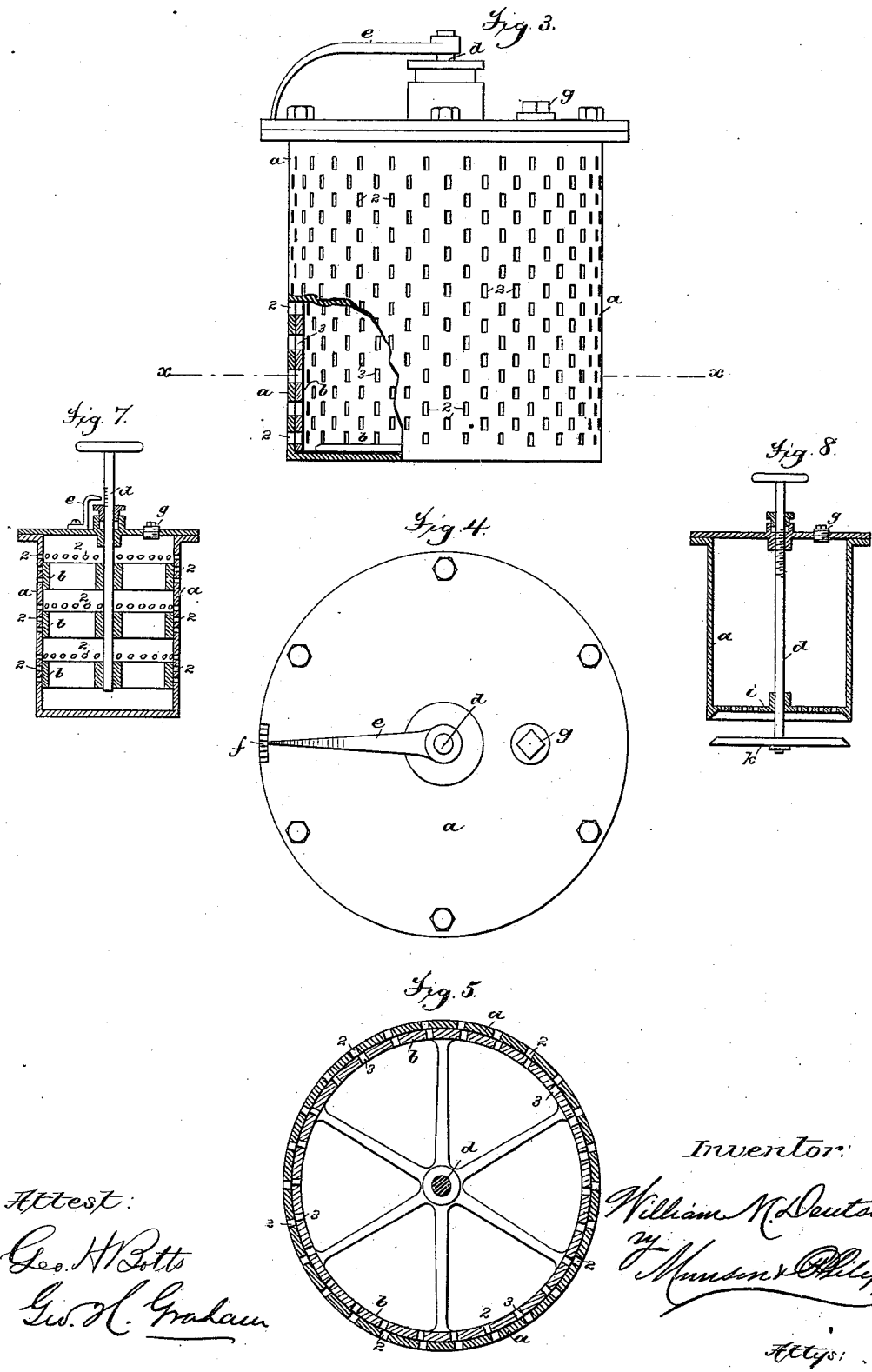
Attest:
Geo. H. Botts
Geo. H. Graham
Inventor:
William M. Deutsch
by Munson & Philipp
Attys.

UNITED STATES PATENT OFFICE.

WILLIAM M. DEUTSCH, OF ELIZABETH, NEW JERSEY.

FILTER.

SPECIFICATION forming part of Letters Patent No. 355,005, dated December 28, 1886.

Application filed September 4, 1886. Serial No. 212,661. (No model.)

*To all whom it may concern:*

Be it known that I, WILLIAM M. DEUTSCH, a citizen of the United States, residing at Elizabeth, county of Union, and State of New Jersey, have invented certain new and useful Improvements in Filters, fully described and represented in the following specification and the accompanying drawings, forming a part of the same.

This invention relates, generally, to the art of filtration.

One feature of the invention relates particularly to a means for introducing a substance into the water before its passage through the filter-bed, whereby the impurities contained in the water are accumulated and precipitated to such an extent as to be more readily caught up and arrested by the granular material forming the filtering-bed. In filtering water by means of a bed of granular material it has been found that in many cases the impurities contained in the water are so fine or of such a nature that they cannot be entirely removed from the water by passing it through the bed unless the bed is made of such fine material and of so great a thickness that considerable time will be required for the water to pass through it, thus making the filtering operation exceedingly slow, and rendering it practically impossible to carry on filtration upon an extensive scale. It has been found, however, that in such cases the operation may be greatly expedited and all the finer impurities in the water be brought into such condition that they will be readily arrested by the bed by introducing into the water previous to its passage through the bed some precipitating substance, by which the impurities will be accumulated, so as to be readily arrested by the granular material of the bed, even if such material is comparatively coarse, so as to permit the water to flow rapidly through it. The substances which are suitable for use for this purpose are well known to those familiar with this art, and need not be herein specifically described. Among these substances those which are most commonly employed are alum, iron, and lime in different forms.

One feature of the present invention, as before stated, relates particularly to an apparatus for introducing any of these substances into the water before it arrives at the filtering-bed.

Another feature of the invention relates particularly to the construction of the discharge-pipe of the filter, whereby an even distribution of the water throughout all parts of the bed is secured when the water is sent through the filter in the reverse direction for the purpose of washing the bed.

The apparatus constituting the present invention may be applied to any of the ordinary forms of filter, and it is therefore to be understood that the invention is not limited in its application to the particular construction of filter illustrated in the present case.

As the invention can be best understood by an illustration and a detailed description of a filter containing the same, such description will now be given, reference being had to the accompanying drawings, in which—

Figure 2:
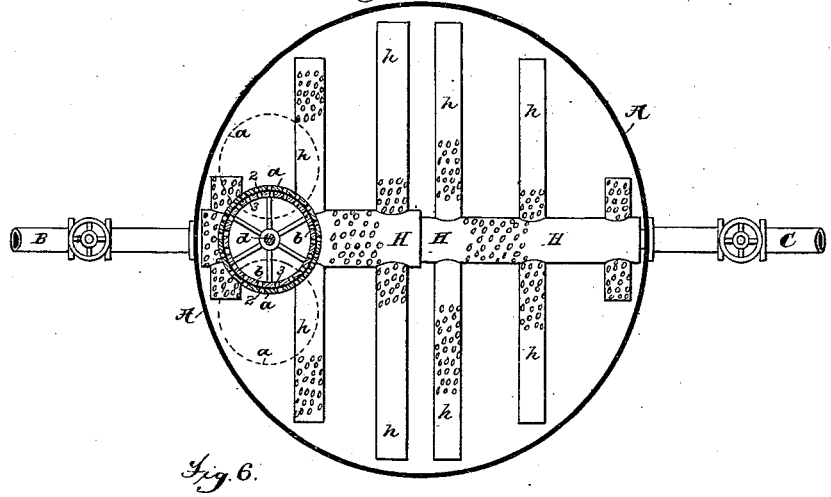
Figure 6:
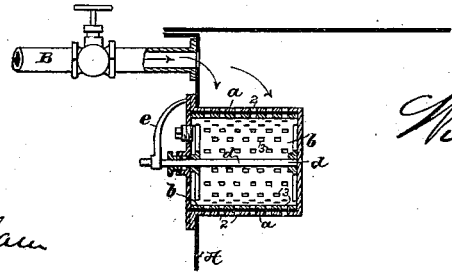

Figure 1 is a sectional elevation of an ordinary filter, showing the present invention applied thereto. Fig. 2 is a horizontal section of the same, taken upon the line $xx$ of Fig. 1. Fig. 3 is a side elevation, partly in section, upon an enlarged scale, of the apparatus for introducing the precipitating substance into the water. Fig. 4 is a plan view of the same. Fig. 5 is a horizontal section of the same, taken on the line $xx$ of Fig. 3. Fig. 6 is a sectional elevation, upon the same scale as Figs. 1 and 2, illustrating a modified arrangement of the apparatus for introducing the precipitating substance into the water; and Figs. 7 and 8 are views illustrating modifications in the construction of the said apparatus, which will be hereinafter referred to.

Referring to Figs. 1 to 5, it is to be understood that A represents the body of the filter, or filter proper, which may be of any suitable form or construction and of any suitable size. As herein illustrated, the filter is of the closed form, in which it is designed that the water shall pass through the filtering-bed under pressure. If the top of the filter is located on or slightly above the level of the source of supply of the water, the filter may be open at its top, instead of closed. As illustrated in the present case, the filter is provided with the usual supply-pipe, B, through which the water enters the filter near its top, and with the usual discharge-pipe, C, through which the water passes from the filter at its bottom. These pipes are provided with suitable cocks or valves, by which the flow of the water through the filter is controlled. The pipe C communicates with a perforated pipe, H, located in the bottom of the filter, and provided with a number of perforated branches, h. It will be observed that the pipe H increases in size from the point of its connection with the pipe C to its inner end. The purpose of this construction is to secure an even distribution of water over the entire area of the bed when the water is sent through the pipes H h in the reverse direction for the purpose of washing the bed.

It will readily be seen that if the pipe H were of the same size throughout its whole length the pressure in the branches h farthest from the pipe C would, during the washing operation, be much less than in those nearest to the pipe C; but by increasing the size of the pipe H toward its inner end the water flows along the pipe more readily than into the branches nearest the pipe C, and thus a uniform, or practically uniform, discharge of water from all of the branches h is secured.

It is to be remarked that the pipe H need not in all cases be perforated, as in many cases the perforations in the branches h will be all that is necessary.

The filtering-bed D is composed of any of the granular materials commonly employed for such purposes. The bed D may be cleansed in any of the ways common in this class of filters; but the filter will preferably be provided with an arrangement of pipes for washing the bed similar to that shown in my application filed on the 10th day of May, 1886, Serial No. 201,635.

Located inside the filter A, and in position to be in the current formed by the water as it flows into the filter, is a small chamber, a, for containing the precipitating substance which it is desired to introduce into the water. This chamber a is so constructed that as the water flows past it a small amount of the precipitating substance will be carried out of the chamber and allowed to mingle with and be distributed through the water. To accomplish this result, the chamber a may be constructed in a variety of ways. The construction shown in Figs. 1 to 6, however, is what is regarded as the best for the purpose. As shown in these figures, the chamber a is provided around its circumference with a large number of small openings, 2, and is provided upon its interior with a cylindrical shell, b, which fits into the chamber a, and is provided with corresponding perforations, 3. The shell b is secured to an axis, d, which passes through a stuffing-box in the top of the chamber a, and is provided with a suitable handle, e, by which it can be turned to different positions, so as to cause the openings 2 3 to coincide with each other to a greater or less extent, as best shown in Fig. 5.

In order to enable the attendant to determine when the openings 2 3 are opened to the proper extent, the handle e may be in the form of a pointer, as shown in the present case, and the top of the chamber a may be provided with a scale, f, which will be graduated to indicate the extent to which the openings 2 3 are opened. The top of the chamber a will preferably be provided with an opening closed by a screw plug or cap, g, through which the precipitating substance can be introduced to the chamber from time to time.

The operation of the apparatus thus constructed is as follows: The chamber a being filled with the precipitating substance, the water, as it enters the filter through the pipe B, will flow against the side of the chamber a, and a portion of it will pass through the openings 2 3 and come in contact with the precipitating substance, so as to absorb or take up a small amount of the same and carry it out of the chamber into the water in the filter. The amount of the substance thus taken up by the water will depend upon the extent to which the openings 2 3 are opened, and this can readily be adjusted by means of the handle e, as has been explained, so as to allow more or less of the precipitating substance to be taken up by the water, as may be required at different times, owing to different conditions of the water. When none of the precipitating substance is required, the openings may be entirely closed. The precipitating substance thus carried out of the chamber a will, by the current formed by the water flowing into the filter, be carried to all parts of the water above the bed, so as to accumulate and precipitate the impurities and cause them to be arrested by the bed as the water percolates downward through it. The precipitating substance will also be arrested at the top of the bed, so as to be prevented from passing out with the filtered water. By this means the process of filtration is rendered continuous, and the precipitating substance is introduced into the water without in any way interrupting the continuous flow of the water or appreciably impeding or obstructing its passage through the filter.

Although it is preferable that the chamber a should be located in the position shown in Fig. 1, it is not necessary that it should be located in this position. As before stated, it may be located in any position where it will be in the current of the water flowing into the filter, and in some cases there may be more than one of the chambers a employed. For instance, there may be two of these chambers located in the positions indicated by dotted lines in Fig. 2, or in any other suitable position. When the water flows into the filter and passes through the bed simply by gravity, the chamber a, instead of being attached to the top of the filter, may be located in the side of the filter, as indicated in Fig. 6, in such position that the stream of water as it flows in from the pipe B will fall upon the side of the chamber. The means for regulating the amount of the precipitating substance which should be discharged from or carried out of the chamber by the water may also be varied, as will readily be seen, without departing from the essential features of the invention.

Two of the many modifications that may be made in this apparatus are illustrated in Figs. 7 and 8. In the construction shown in Fig. 7 the shell $b$, instead of being perforated, is made in sections which are connected together, and the shell is arranged to be raised and lowered to cover and uncover the openings 2. In this case the amount of the precipitating substance which will pass out of the chamber $a$ will be determined by the number of the openings 2 which are uncovered, instead of by the extent to which they are uncovered. In the construction shown in Fig. 8 the sides of the chamber $a$ are not perforated; but the bottom $i$ of the chamber $a$ is perforated, and is provided with a valve or false bottom, $k$, which can be lowered to a greater or less extent to permit more or less of the water to come into contact with the precipitating substance through the perforations in the bottom $i$. In either of these cases the rod $d$ may be provided with a pointer, $e$, which will lie adjacent to a scale, $f$, and thus indicate the position of the valve $k$ or shell $b$.

I am aware that it has been proposed to introduce a precipitating substance into the water previous to its entrance into a filter, and that it has been proposed to accomplish this by locating the precipitating substance in a chamber which communicated with the induction-pipe, and providing the induction-pipe with a valve or gate, by which a greater or less proportion of the water passing through the pipe would be directed into contact with the precipitating substance. This arrangement is, however, objectionable, for the reason that the valve located in the induction-pipe partially closes the pipe, and thus offers an obstruction to the passage of the water. Aside from this, the obstruction offered by the valve varies with the different positions of the valve, so that a uniform flow of water into the filter is prevented. By locating the chamber containing the precipitating substance inside the filter-body the induction-pipe is left practically unobstructed, so that a perfectly uniform delivery of the water to the filter is provided. By the construction shown in the present case, also, means are provided for regulating the amount of the precipitating substance introduced into the water with perfect accuracy.

What I claim is—

1. The combination, with a filter having induction and discharge pipes arranged to maintain a continuous flow of water through the filter, of the chamber $a$, located inside the filter and containing a precipitating substance, and provided with openings through which a portion of the water passing through the filter is allowed to come into contact with said substance, so as to carry a portion of it out of the chamber, substantially as described.

2. The combination, with a filter having induction and discharge pipes arranged to maintain a continuous flow of water through the filter, of the chamber $a$, located inside the filter and containing a precipitating substance, and provided with openings through which a portion of the water passing through the filter is allowed to come into contact with said substance, so as to carry a portion of it out of the chamber, and means for regulating the amount of precipitating substance discharged from the chamber, substantially as described.

3. The combination, with a filter having induction and discharge pipes arranged to maintain a continuous flow of water through the filter, of the chamber $a$, located inside the filter, and containing a precipitating substance and provided with the openings 2, and the adjustable shell $b$, for regulating the size of the openings 2, substantially as described.

4. The combination, with the filter and the filtering-bed, of the pipe H, communicating with discharge-pipe C and having the perforated branches $h$, and being of larger size at its inner end than at its junction with the pipe C, substantially as described.

In testimony whereof I have hereunto set my hand in the presence of two subscribing witnesses.

WILLIAM M. DEUTSCH.

Witnesses:
J. A. HOVEY,
GEO. H. GRAHAM.